United States Patent [19]

Ikizyan et al.

[11] Patent Number: 6,064,334
[45] Date of Patent: May 16, 2000

[54] CLUTTER RESISTANT TARGET DETECTOR

[75] Inventors: Ike A. Ikizyan, Downey; Thomas L. Spieker, San Juan Capistrano; Greg A. Shreve, San Pedro, all of Calif.

[73] Assignee: TRW Inc., Redondo Beach, Calif.

[21] Appl. No.: 09/116,332

[22] Filed: Jul. 15, 1998

[51] Int. Cl.[7] .................................................. G01S 13/526
[52] U.S. Cl. ......................... 342/159; 342/162; 342/196; 342/93
[58] Field of Search ................................. 342/159, 162, 342/196, 93

[56] References Cited

U.S. PATENT DOCUMENTS

| | | | |
|---|---|---|---|
| 5,231,403 | 7/1993 | Pierce | 342/192 |
| 5,277,801 | 1/1994 | Pierce | 342/192 |
| 5,402,131 | 3/1995 | Pierce | 342/194 |
| 5,483,549 | 1/1996 | Weinberg et al. | 375/200 |
| 5,515,300 | 5/1996 | Pierce | 364/572 |
| 5,534,866 | 7/1996 | Rose | 342/13 |

OTHER PUBLICATIONS

"E–pulse scheme based on higher–order statistics for radar target discrimination in the presence of colured noise", Gallego, A.; Ruiz, D.P.; Carrion, M.C., Electronics Letters, vol.: 32 4, Feb. 15, 1996, p. : 396.

"Neural networks for sequential discrimination of radar targets", Haimerl, J.A.; Geraniotis, E., Radar Conference, 1991., Proceedings of the 1991 IEEE National, 1991, pp. 93–97.

"Multiscale modelling for target detection in complex synthetic aperture radar imagery", Schroeder, J.; Howard, D.; Gunawardena, A., Information, Decision and Control, 1999. IDC 99. Proceedings 1999, pp. 77–82.

"Efficient speckle filtering of SAR images", Hagg, W.; Sties, M., Geoscience and Remote Sensing Symposium, 1994. IGARSS '94. Surface and Atmospheric Remote Sensing: Technologies, Data Analysis and Interpretation., International vol.: 4, 1994, Page(s).

"CFAR for homogeneous part of high–resolution imagery", Lank, G.W.; Chung, N.M., Aerospace and Electronic Systems, IEEE Transactions on vol. 28 2, Apr. 1992, pp. 370–382.

"Autoregressive modeling of radar data with application to target identification", Moses, R.L.; Carl, J.W., Jr., Radar Conference, 1988., Proceedings of the 1988 IEEE National, 1988, pp. 220–224.

*Primary Examiner*—John B. Sotomayor
*Attorney, Agent, or Firm*—Michael S. Yatsko

[57] ABSTRACT

A ranging device is disclosed that monitors for changes in a scene of interest. The ranging device includes a transmitter that sends pulses into the scene, a receiver that generates pulse samples in response to pulse returned from the scene, and a target discriminator that analyzes the pulse samples. The target discriminator detects targets entering the scene, targets leaving the scene, and targets moving in the scene through the use of at least one non-averaging statistical characteristic of the pulse samples. The target discriminator may generate short term and long term high order statistical samples in response to the pulse samples as well as detector samples consisting of the ratio of high order statistical samples. The detector samples are highly indicative of the presence or absence of a target in the scene. The target discriminator may also include a post processor that evaluates the detector samples, applies additional discrimination functions to the detector samples, and determines the presence or absence of a target in the scene of interest.

58 Claims, 5 Drawing Sheets

CLUTTER RESISTANT TARGET DETECTOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to the detection of targets in a scene with a ranging device or ranging process such as radar. More specifically, the invention relates to the detection of targets entering, leaving, or moving in a scene containing background clutter such as roadbeds, telephone poles, and railroad tracks even though the target does not return a significant amount of energy over and above the energy returned by the background clutter.

Radar, an acronym for Radio Detection and Ranging, is used to detect, determine range, measure angles, and determine velocity of targets. Radar is one in a class of ranging devices including, for example, sonar. In operation, a radar typically generates high voltage pulses, sends them through a radio frequency amplifier, then applies the amplified pulses to an antenna for radiation into space or into a scene. The antenna may be steered, possibly by a servo-driven pedestal, or it may be stationary. A stationary radar may also be referred to as a "staring" radar because it always radiates pulses, i.e., "looks", at the same scene.

The radiated pulses coming off the antenna travel through space until they completely dissipate, or until they hit an object or a target. Objects and targets reflect the radiated pulses back to a receiver. The receiver is connected to additional electronics, an amplifier, typically, and additional signal processing equipment that extracts information from the received pulses and displays that information on a screen or provides the information to subsequent processing electronics such as a filter. The received pulses may be converted to digital samples during this process. The process of sending a radiated pulse and gathering the received pulse is often referred to as a "sweep" of the background.

There are no fundamental limits of the frequency of radiated pulses that a radar may use. Radars have been operated at wavelengths spanning many orders of magnitude, for example, from $10^{-7}$ m to 100 m. Furthermore, there is no requirement that a radar use an antenna per se. Rather, the radar need only provide an emitter that sends radiated pulses into a scene and a receiver that gathers the received pulses reflected back. An alternative emitter may be chosen by taking into account a number of factors including the wavelength of the radiated pulses. For example, for radiated pulses that have a wavelength in the visible spectrum, the emitter may consist of a light emitting diode rather than an antenna. The receiver may then consist of a photodiode or optocoupler. This flexibility makes radar useful in many diverse applications including air surveillance, weather forecasting, and astronomy.

Because a staring radar always looks at the same scene, it may be used to monitor a border, for example to detect people trying to enter a compound or cross a boundary or perimeter. Such a radar could also be set up to look down a set of railroad tracks to detect movement along or across the tracks, detect targets in the field, and alert someone monitoring the area. One way to process data in a ranging application is to divide the radar's range into discrete segments. A discrete segment is termed a range "bin" and may, for example, be approximately one foot long. The signal processing equipment in the radar would then take the received pulses and return a range profile that represents the energy in the received pulses as a function of range. The range profile may consist, for example, of a vector (a single column of numbers) which represents the amplitudes of the energy returned in the received pulses for each range bin. A typical target, for example a person, may be wide enough to cover two or three range bins. Some targets are difficult to detect, however, due to background clutter present in the scene.

A staring radar does not always look out into empty space. In most instances, the radar looks at a scene that may include large amounts of background clutter. Background clutter generally refers to everything except the target that the radar is trying to detect and includes, for example, telephone poles, railroad rails, roadbeds and other fixed objects in the view of the radar. A staring radar may, for example, have a range of 1000 feet. The background clutter would then include all the fixed objects in the entire 1000 foot range.

Previous radars have had difficulty picking out targets from among the background clutter because the background clutter, although fixed, returns different amounts of radiated energy in the form of received pulses from one sweep to the next. In other words, the background clutter does not present the same amount of returned energy from one sweep to the next. Rather, the background clutter returns energy in received pulses that exhibit a high variance around the average value of the energy in the received pulses. Thus, although the average energy in a received pulse may stay approximately the same over a long period of time, the variance in amount of energy in a received pulse is substantial. The variance is caused, in part, by preexisting electromagnetic noise in the scene, multiple return paths for the received pulses, and noise in the radar system electronics. The variance prevents previous radars from determining when, exactly, a desired target is in the scene and a detection should be declared.

These previous radar systems, expect each sweep of the background clutter to return the same average energy, and would identify (incorrectly) a disturbance above the average (caused by variance in received pulses around the average) as a detection. Furthermore, if the radar takes into account the variance in the received pulses, then the radar is unable to detect small targets, or targets returning small amounts of energy. The inability of the radar to detect small targets is due in part to the fact that the average energy of the received pulses in a scene is much larger (due to the large objects composing the background clutter) than the energy returned by a small target. Because the average energy is large and the variance in received pulses is a significant fraction of the average energy, a typical radar cannot detect small targets.

The additional energy that the small targets return in a received pulse is not much larger than the variance in background clutter from one sweep to the next. In fact, the additional energy may be far smaller in many cases. Therefore, the radar, without taking into account additional considerations, cannot determine if the additional energy is, in reality, a new target entering the scene, or simply variance in the received pulses returned by the background clutter.

In the past, radar systems have addressed the problem of variance in the received pulses using a Constant False Alarm Rate (CFAR) technique. CFAR recognizes that there will always be a given amount of variance in the energy content of the received pulses, including variance due to other factors including the radar's own internal noise, for example, thermal noise. In order to avoid numerous false alarms due to variance in the received pulses, CFAR chooses a limit, called the constant false alarm rate. The energy content in a receive pulse must lie above the CFAR limit before the radar detects a desired target. The CFAR limit is based on an analysis of the probability density function of the received pulse variance. A value is selected from the probability density function that gives an acceptable percentage of false alarms. Regardless of the CFAR limit, however, a false alarm may still occur.

It may be assumed that the noise causing the variance in received pulses is a Gaussian function (i.e., the probability density function of the variance has tails that go out to infinity), and thus there will always be a received pulse with enough variance to cause the received pulse energy level to rise above the CFAR limit. Hence, it is always possible to detect a target when no target, in reality, is present (i.e., on the basis of noise only). This false detection is called a false alarm. Choosing the CFAR limit thus sets the false alarm rate. The CFAR limit may be chosen, for example, such that false alarms occur 1 in 1,000 sweeps or 1 in 10,000 sweeps. A higher CFAR limit reduces the false alarm rate, but also increases the size of the smallest target the radar can detect.

Thus, previous radars operate according to methods that have significant drawbacks. Either the radar ignores targets that do not return significant amounts of energy (including small targets) because the returned energy is under the CFAR limit, or the radar operates without a CFAR limit and therefore experiences numerous false alarms.

Thus, a need remains for an improved target detector which overcomes the disadvantages discussed above and previously experienced.

BRIEF SUMMARY OF THE INVENTION

It is an object of the present invention to provide a ranging device that may detect targets in the presence of background clutter.

It is a further object of the present invention to provide a ranging device having computationally efficient hardware to support the detection of targets in the presence of background clutter.

Another object of the present invention is to use high order statistics to improve the target detection capabilities of a ranging application like radar or sonar.

These and other objects are achieved by a target detector according to the present invention that can detect a target among background clutter in a scene. The target detector may be used in a ranging device using an emitter to produce pulses that are radiated into the scene (these pulses are called "radiated pulses").

A receiver is located proximate to the emitter. The receiver gathers returned pulses incident upon the receiver (these pulses are called "received pulses"). The target and background clutter generate returned pulses by reflecting radiated pulses back to the receiver. The receiver also produces pulse samples representative of the received pulses. The pulse samples may consist of the results of an analog to digital conversion of the received pulses or of the results of more sophisticated signal processing on the received pulses, such as the output of a filter or a FFT (fast Fourier transform).

The invention incorporates a target detector to help determine from one sweep to the next whether a target is present in the scene. The output of the target detector is connected to a post processor which determines whether a target is present in a scene based upon further examination of the output of the target detector. To help determine whether a target is present in a scene, the target detector generates a short term high order statistic associated with the pulse samples, a long term high order statistic associated with the pulse samples, and a detector sample ratio that represents the ratio of the short term high order statistic to the long term high order statistic.

The short term high order statistic may be the short term variance of a predetermined number of pulse samples. Similarly, the long term high order statistic may be the long term variance of the pulse samples. The post processor may then determine whether a target is present in the scene based on the detector samples. The post processor may also incorporate a threshold limit such that the post processor ignores changes in the detector samples below the level of the threshold limit. The ranging device may also configure the post processor to use more sophisticated methods of determining a detection or a non-detection. For example, the post processor may determine a detection when a minimum number of detector samples from a larger set of samples lie above the limit threshold, for example 3 of 5, or 3 consecutive, and the like.

The ranging device may also incorporate a set of target detectors or post processors as described above in order to process a number of range bins in parallel. For example, if the ranging device divides the scene into 10 range bins, there might be 10 target detectors and post processors determining whether a target is present in each of the 10 range bins simultaneously.

A digital signal processor (DSP) may be used to implement the target detector or post processor. Discrete circuitry or a number of DSPs may also be used to provide the functionality of the target detector or post processor.

The target detector may also incorporate a startup function that allows the target detector to quickly generate an initial value for the long term high order statistic based on a few initial pulse samples. Thus, the ranging device may quickly enter operation shortly after being activated. The startup function may then adjust the determination of the long term high order statistic while the target detector is receiving additional pulse samples such that the determination gives more weight to the past estimate of the long term high order statistic and less weight to the current pulse samples. The startup function may be used in connection with a computationally efficient method of determining the long term high order statistic, for example using a single pole filter or a first order recursive filter referred to as a "leaky accumulator".

BRIEF DESCRIPTION OF THE SEVERAL VIEWS OF THE DRAWING

FIG. 3a shows an example of the average sample pulse energy and the variance around the average returned by a first scene.

FIG. 3b depicts the short term variance statistic determined by the target detector in response to pulse samples shown in FIG. 3a.

FIG. 3c depicts the long term variance statistic determined by the target detector in response to the pulse samples shown in FIG. 3a.

FIG. 3d depicts the detector samples determined by the target detector in response to the pulse samples shown in FIG. 3a.

FIG. 4a shows an example of the average sample pulse energy and the variance around the average returned by a second scene.

FIG. 4b depicts the short term variance statistic determined by the target detector in response to pulse samples shown in FIG. 4a.

FIG. 4c depicts the long term variance statistic determined by the target detector in response to the pulse samples shown in FIG. 4a.

FIG. 4d depicts the detector samples determined by the target detector in response to the pulse samples shown in FIG. 4a.

DETAILED DESCRIPTION OF THE INVENTION

Figure 1:
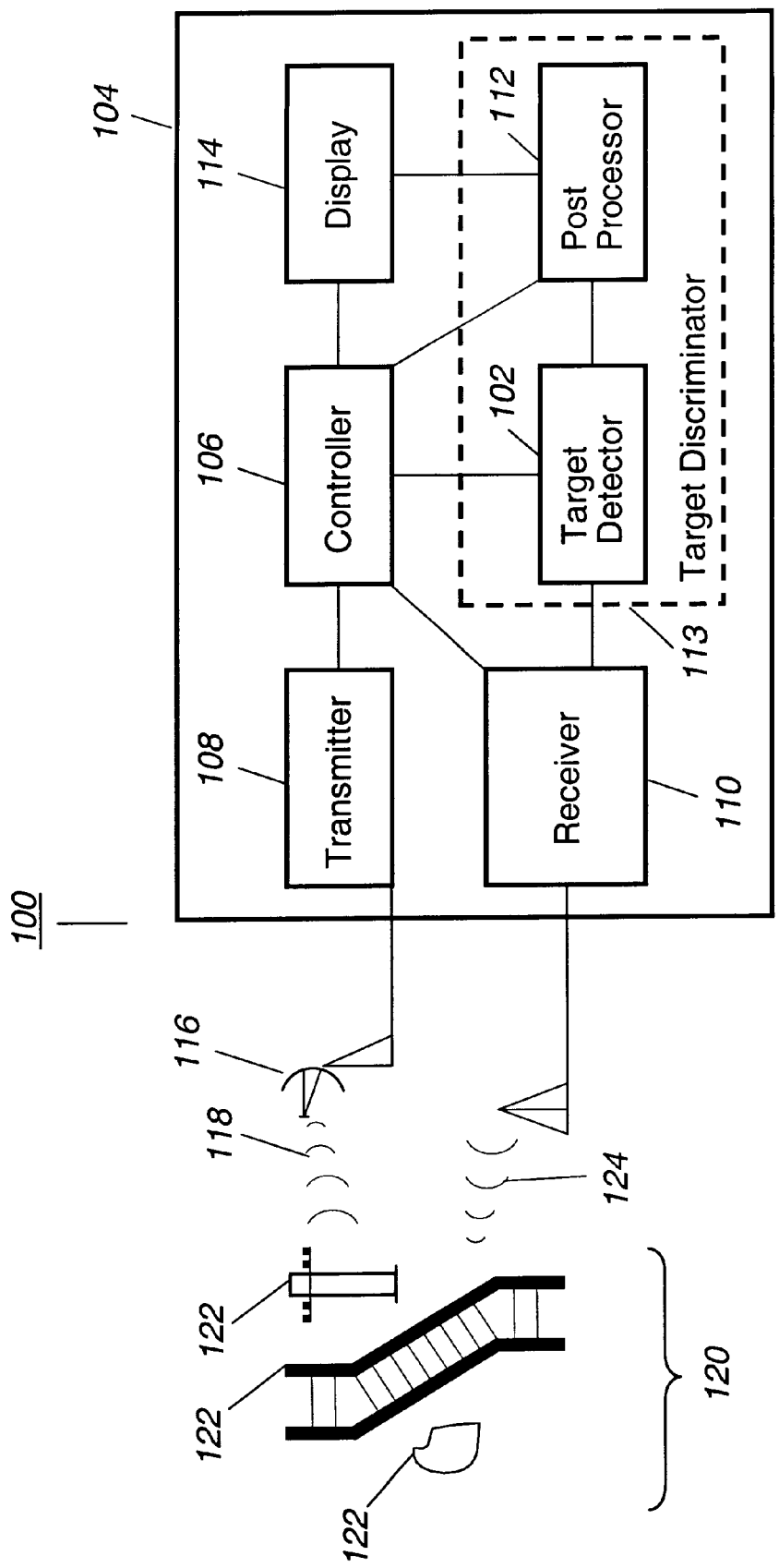
FIG. 1 illustrates a high level block diagram of a ranging device.

Turning now to FIG. 1, a block diagram of a ranging device 100 using the target detector 102 of the present invention is shown. FIG. 1 illustrates only one of many possible configurations for a ranging device 100. The target detector 102 is not limited to use in any particular configuration, but may be used to analyze pulse samples gathered by a wide variety of ranging systems, including sonar. The ranging device 100 contains a set of operational circuitry 104, including a controller 106, transmitter 108, a receiver 110, a target detector 102, a post processor 112, a target discriminator 113 (generally including the target detector 102 and the post processor 112), and a display 114.

The controller 106 is responsible for the overall operation and supervision of the ranging device 100. The controller 106 may be implemented in several ways. The controller 106 may, for example, include a central processing unit (CPU), a DSP, or a set of discrete circuitry, that manages and coordinates the interactions between the transmitter 108, the receiver 110, the target detector 102, the post processor 112, the target discriminator 113, and the display 114. The controller 106 may also, for example, determine the distance range over which the ranging device 100 looks, thereby defining the scene with which the ranging device is concerned. In a preferred embodiment of the present invention, the range may be approximately 1000 feet, though there are no range limits inherent with the target detector 102.

The transmitter 108 is connected to the transmit antenna 116. In order to perform a sweep, the transmitter 108 generates voltage pulses that are used to drive the transmit antenna 116. The transmit antenna 116 responds to the voltage pulses by producing radiated pulses 118 which travel through the air into a scene 120. The scene consists, essentially, of all the objects 122 in the distance range defining the scene 120. The objects 122 reflect the radiated pulses 118, thereby generating reflected pulses 124. A portion of the reflected pulses 124 return to the receive antenna 126. Note that in many applications, the receive antenna 126 may be the same as, and part of, the transmit antenna 116.

The receive antenna 126 gathers the reflected pulses 124 incident upon it. The reflected pulses 124 manifest themselves as voltage pulses constituting received pulses in the receive antenna 126. The receive antenna 126 communicates these received pulses over a conductor to the receiver 110. The receiver 110 takes the received pulses and generates pulse samples from them for processing by the target detector 102. In generating the pulse samples, the receiver 110 may perform initial conditioning, such as amplification, filtering or analog to digital conversion, upon the received pulses. The receiver 110 may also perform more complicated signal processing functions, such as a FFT, before sending the resultant pulse samples to the target detector 102.

The target detector 102 processes the pulse samples provided by the receiver 110 and generates a set of detector samples that are highly indicative of a target detection or a non-detection. The target detector 102 delivers the detector samples to a post processor 112 which examines the detector samples and updates the display 114 according to whether the detector samples indicate a detection or a non-detection. The post processor 112 may provide additional detection discrimination functions, such as requiring that, for example, two of the last three sweeps indicate a detection before such is indicated on the display 114.

The display 114 provides a mechanism by which a viewer may inspect the operation of the ranging device 100 and observe the results of a sweep executed by the ranging device 100. The display 114 may be a CRT type display, a printing device, status lights, or any other mechanism used to convey or present information.

Figure 2:
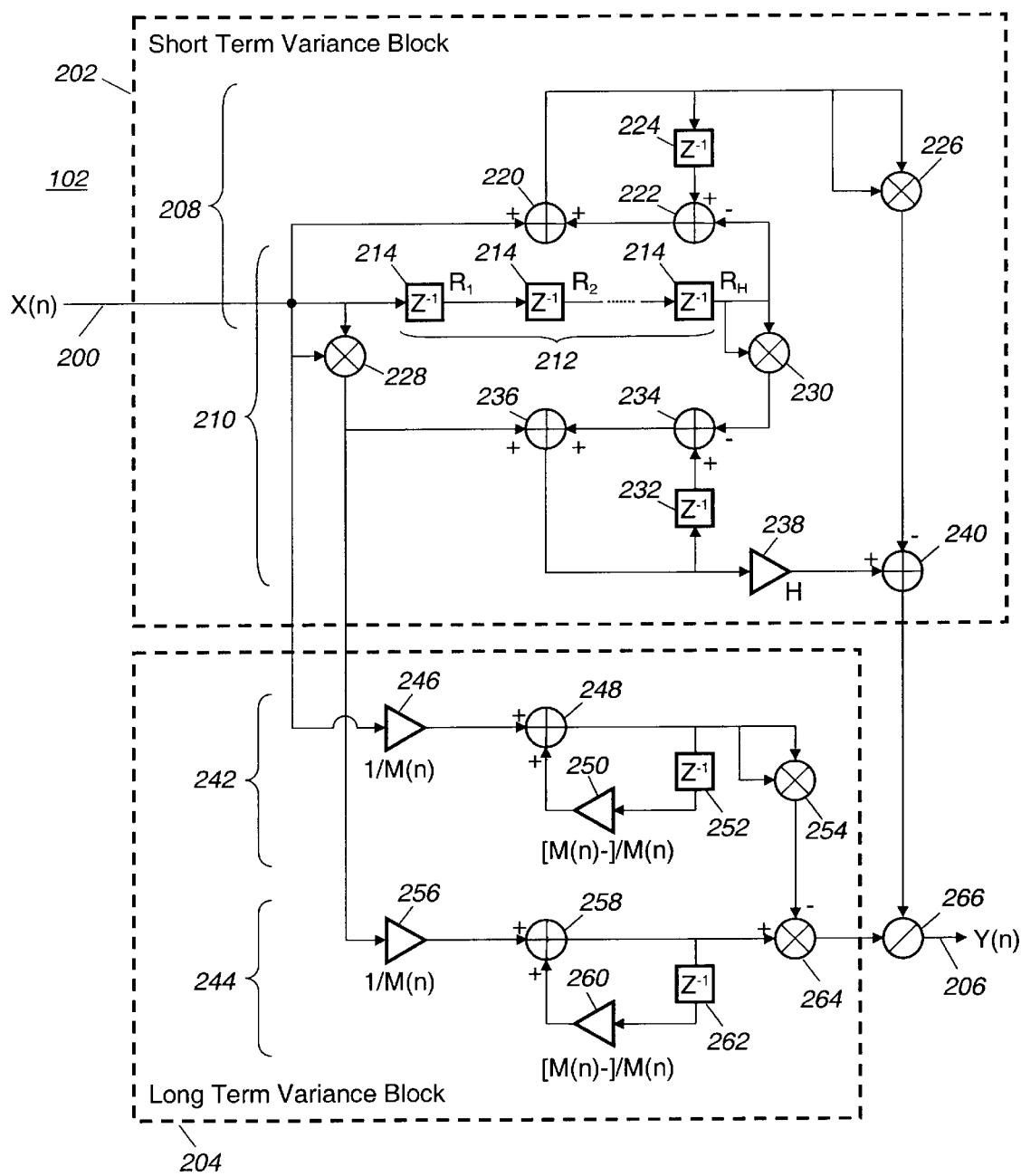
FIG. 2 shows a hardware diagram of a target detector that is used to help identify when a target is present in a scene.

Turning now to FIG. 2, a more detailed illustration of the preferred embodiment of the target detector 102 is provided. The target detector 102 includes a pulse sample input 200, a short term variance block 202, a long term variance block 204, and a detector sample output 206. The pulse sample input 200 is labeled "X(n)", a shorthand notation for labeling, collectively, the series of pulse samples created by the receiver 110. It is also used to indicate the current value of X (i.e., at time n, the value of X is X(n)). The pulse samples generated by the receiver 110 are presented on the pulse sample input 200 at a predetermined interval which may be approximately 50 milliseconds (ms) (the equivalent of 20 pulse samples per second). The interval determines how quickly pulse samples are generated by the receiver 110 and may be faster or slower than 50 ms depending on the demands of the application in which the ranging device 100 is used. The pulse samples presented on pulse sample input line 200 collectively form a sequence of values of X, X(n), where n is an index used to indicate a particular value of X. For example, the first value may be referenced as X(0), the second value as X(1), and so on. As an additional example, if it is assumed that the successive values of X presented on the pulse sample input 200 are 0, then 3, then 9, then 7, then X(n) is denoted {0,3,9,7} and, for example, X(0)=0 and X(2)=9. Similarly, the detector sample output 206 is labeled "Y(n)" to indicate that the target detector 102 will produce a series of successive values of Y, the detector samples, on the detector sample output 206.

The short term variance block 202 includes "square-of-sums" circuitry 208 and "sum-of-squares" circuitry 210, both including delay line 212. Delay line 212 is composed of a predetermined number delay elements 214, each of which may store a single value of X(n). As shown in FIG. 2, the delay elements 214 are connected in series so that the values of X(n) stored in the delay elements 214 propagate through the delay elements 214 from left to right on the arrival of a new value of X(n) on the pulse sample input 200. Label $R_1$ thus indicates the delay element 214 that contains the previous value of X(n) (i.e., X(n−1)), label $R_2$ indicates the delay element 214 that contains the value of X(n−2), and label $R_H$ indicates the delay element 214 that contains the $H^{th}$ oldest value of X(n), X(n−H). In a preferred embodiment of the target detector 102, there may be approximately 16 delay elements 214 in delay line 212, that is, H is approximately 16. When the target detector 102 starts up or is reset, all delay elements in the target detector 102 are typically initialized with a zero value. The operation of the square-of-sums circuitry 208 is discussed next.

Adder 220 adds X(n) to the value produced by the adder 222 to form a current sum of the last H values of X(n). The presence of a minus sign "−" next to the input of adder 222 specifies that the value of the input is negated before addition. In such a situation, the adder 222 actually performs a subtraction operation with respect to the negated input. A plus sign, "+", next to an adder input indicates that the particular input is not negated before addition.

The output of adder 220 is the current sum of the last H values of X(n), and is stored in the delay element 224 and also sent to the multiplier 226. Note that the output of the adder 222 is the value stored in the delay element 224, minus the $H^{th}$ oldest value of X(n) (provided by the delay element 214 labeled $R_H$). Thus, when a new value of X(n) arrives on the pulse sample input 200, the adder 222 subtracts the $H^{th}$ oldest value of X(n) from the value stored in delay element 224 and sends the result to adder 220. Adder 220 adds that result to the current value of X(n) to form the current sum of the last H values of X(n). Summarizing, when a new value of X(n) arrives on pulse sample input 200, the square-of-sums circuitry 208 subtracts the oldest value of X(n) that is stored in the delay line 212 and adds the new X(n) present on the pulse sample input 200 to keep the sum current over the H most recent values of X(n). The current sum of X(n) is then fed to multiplier 226, which provides as its output the square of the current sum of the H most recent X(n) (shown schematically as the output of adder 220 splitting into two branches at multuplier 226 to be multiplied against each other).

The elements of FIG. 2, including the adders, gain elements, multipliers, and dividers may be constructed in a variety of manners. One approach is to use discrete circuitry to build each component. Another approach is to perform the functions of the elements in FIG. 2 through the use of internal operations of a DSP. The delay elements may be constructed as memory cells large enough to hold a single value of X(n) or may be implemented as registers or memory inside a DSP.

The sum-of-squares circuitry 210 produces the sum of the squares of the last H X(n) values. Multiplier 228 produces the square of X(n), while multiplier 230 produces the square of the $H^{th}$ oldest X(n) provided by the delay element 214 labeled $R_H$. Delay element 232 stores the previous value of the sum of the squares over the last H X(n). When a new value of X(n) arrives on input sample line 200, adder 234 subtracts the oldest value of X(n) (stored in delay element 214), squared, in the delay line 214 from the previous value of the sum of the squares of the last H X(n) values stored in delay element 232. Adder 236 then adds to that the new X(n), squared, produced by multiplier 228, to form the current sun of the squares of the last H X(n) values. The current sum is then stored in delay element 232.

Gain element 238 multiplies the output of adder 236 by H. The value of H used in gain element 238 is the same as the number of delay elements 214 in delay line 212. The gain element 238 performs this multiplication to take into account the proportionality difference between the output of the square-of-sums block 208 at multiplier 226 and the output of the sum-of-squares block 210 at adder 236.

Where the values of X(n) are approximately equal (for example, where the ranging device 100 stares at a fixed scene), the output of the square of the sums block 208 will be approximately H times as great as the output of the sum of the squares block 210. Thus, in order to perform a meaningful comparison between the two, the output of the sum-of-squares block is multiplied by H. Note that adder 240 takes the output of the gain element 238 and subtracts the output of multiplier 226 to produce the difference between the sum of the squares of the last H X(n) and the square of the sums of the last H X(n). After the multiplication by H in gain element 238, the output of the adder 240 reflects the classic formulation of a short term variance statistic computed over the last H X(n) values. The multiplication by H ensures that the short term variance will be approximately zero if the values of X(n) are approximately equal.

Note that the time duration over which the short term variance statistic is determined is H samples times the duration between pulse samples. The number H or the duration between pulse samples may be adjusted to fine tune the target detector 102. For example, quickly moving targets may not remain in the scene for an extended period of time. Therefore, in an application where quickly moving targets are expected, the target detector may benefit from decreasing the value of H or decreasing the pulse sample interval, both of which would allow the target detector 102 to react more quickly to changes in the pulse samples.

Turning now to the long term variance block 204, it includes of a "square-of-the-average" block 242 and an "average-of-the-squares" block 244. Blocks 242 and 244 determine accurate approximations to averages without computing the rigorous definition of average: sum of elements divided by number of elements. The square-of-the-average block 242 provides an accurate estimation of the long term average value of X(n), squared. The square-of-the-average block 242 first takes the current value of X(n) and multiplies it by the factor 1/M(n) using gain element 246. M(n) represents a startup function that allows the long term variance block 204 to quickly obtain initial approximations to the square-of-the-average of X(n) and the average-of-the-squares of X(n). M(n) further allows the long term variance block 204 to gradually give more weight to the previous determination of the square-of-the-average of X(n) and the average-of-the-squares of X(n) and less weight to the current value of X(n). The startup function is more fully described below. Adder 248 adds the output of the gain element 246 and the gain element 250 and stores the result in the delay element 252. Gain element 250 multiplies the result stored in delay element 252 by [M(n)−1]/M(n). The sum produced by adder 248 is thus a fraction of the new value of X(n) plus a fraction of the last determination of the long term average value of X(n) (stored in delay element 252). The output of adder 248 thus accurately tracks the value of the long term average value of X(n) and stores that value in delay element 252. The long term average value of X(n) is also applied to the multiplier 254. In response, the multiplier 254 generates the square of the long term average value of X(n) as an output.

The average-of-the-squares block 244 operates in substantially the same manner as the square-of-sums block 242, but produces an output representative of the average of the sum of the squares of the X(n) values. Note that gain element 256 operates on the value of X(n) squared because gain element 256 is connected to the output of multiplier 228. The average-of-the-squares block 244 first takes the current value of X(n), squared and multiplies it by the factor 1/M(n) using gain element 256. M(n) represents the same startup function used above in the square-of-sums block 242. Adder 258 produces the sum of the gain element 256 and the gain element 260 and stores the result in the delay element 262. Gain element 260 multiplies the result stored in delay element 262 by [M(n)−1]/M(n). The sum produced by adder 258 is thus a fraction of the new value of X(n) squared, plus a fraction of the previous determination of the long term average value of X(n) squared (stored in delay element 262). The output of adder 258 thus accurately tracks the value of the long term average of X(n) squared and stores that value in delay element 262. Finally, the adder 264 takes the value of the long term average of X(n) squared and subtracts the value of the long term average of the square of the sums of X(n). The output of adder 264 thus approximates the result obtained by the classic formulation of a long term variance statistic computed over the X(n) values without requiring memory containing numerous past samples.

In the preceding discussion, M(n) represents a series of values for M in the same manner that X(n) represents a series of values of X. In a preferred embodiment, M(n)={1, 2,3, ..., $M_{max}, M_{max}$, ...} and the value of $M_{max}$ may be approximately 1000, although even larger values such as 10,000 are also suitable. The startup function M(n) allows the hardware in the long term variance block to attain quickly initial values for the long term square-of-the-average of X(n) and long term average-of-the-squares of X(n) computations. M(n) gradually gives more weight to the previous computation of the long term square-of-the-average of X(n) and long term average of squares of X(n) as subsequent values of X(n) appear on the pulse sample input 200.

Table 1 illustrates the operation of the elements in the square-of-the-average block 242. Note that the value stored in delay element 252 immediately approaches the average value of X(n), then gradually gives more weight to previous values of the average. Table 1 illustrates only the first four operations of the square-of-the-average block 242. In practice there may be many thousands of such operations.

Table 2 illustrates the operation of the elements in the average-of-the-squares block 244. Note that the value stored in delay element 262 immediately approaches the average value of X(n) squared, then gradually gives more weight to previous values of the average. Table 2 illustrates only the first four operations of the average-of-the-squares block 244. In practice there may be many thousands of such operations.

TABLE 1

| n | X(n) | M(n) | Output of gain element 246 | Output of gain element 250 | Value stored in delay element 252 |
|---|------|------|----------------------------|----------------------------|-----------------------------------|
| 0 | 30 | 1 | 1 * 30 = 30 | 0/1 * 0 = 0 | 30 + 0 = 30 |
| 1 | 33 | 2 | ½ * 33 = 16.5 | ½ * 30 = 15 | 16.5 + 15 = 31.5 |
| 2 | 26 | 3 | ⅓ * 26 = 8.67 | ⅔ * 31.5 = 21 | 8.67 + 21 = 29.67 |
| 3 | 27 | 4 | ¼ * 27 = 6.75 | ¾ * 29.67 = 22.25 | 6.75 + 22.25 = 29 |

TABLE 2

| n | X(n) | M(n) | Output of gain element 256 | Output of gain element 260 | Value stored in delay element 262 |
|---|------|------|----------------------------|----------------------------|-----------------------------------|
| 0 | 30 | 1 | 1 * 900 = 900 | 0/1 * 0 = 0 | 900 + 0 = 900 |
| 1 | 33 | 2 | ½ * 1089 = 544.5 | ½ * 900 = 450 | 544.4 + 450 = 994.5 |
| 2 | 26 | 3 | ⅓ * 676 = 225.33 | ⅔ * 994.5 = 663 | 225.33 + 663 = 888.33 |
| 3 | 27 | 4 | ¼ * 729 = 182.25 | ¾ * 888.33 = 666.25 | 182.25 + 666.25 = 848.5 |

Note that the long term variance block 204 does not need to store every previous value of X(n) in order to compute the long term variance. Instead, the approach described above provides an accurate representation of the long term variance using the weighting function M(n). This approach is called a single pole filter, or a "leaky accumulator" approach. This approximation is particularly good in an application in which the ranging device 100 stares at a fixed scene. Since the scene is not expected to change significantly, successive values of X(n) tend to be close together. Therefore, the approach described above may use the leaky accumulator technique to quickly obtain an excellent approximation of the long term variance statistic. Another advantage of the leaky accumulator implementation is that it only uses two delay elements 252 and 262 to perform the functions in the long term variance block 204. Determining long term statistics according to standard textbook formulas would require storage for every sample value generated by the receiver 110. This would consume an inordinate amount of storage space in digital registers or in memory in a dedicated digital signal processor and make the construction of the ranging device 100 more complex and more expensive.

Finally, divider 266 determines a detector sample by dividing the short term variance computed by the adder 240 by the long term variance computed by adder 264. A new detector sample is produced on the detector sample output 206 for each new input X(n) arriving on sample input line 200. The sequence of detector sample outputs is referred to as Y(n). The detector samples Y(n) provide a series of samples that are highly indicative of targets entering, leaving, or moving in the scene that the ranging device 100 sweeps.

Although the target detector 102 shown in FIG. 2 uses a high order statistic, namely variance, to create detector samples indicative of the presence or absence of a target, it is possible to use higher order statistics as well. For example, the target detector may be designed to use a higher order statistic such as the variance of the variance of X(n) to detect targets known to creates disturbances of that type in the X(n) values.

Turning now to FIGS. 3a—3d, they show an example of the operation of the ranging device 100 staring at a fixed scene 120 and incorporating the target detector 102. The horizontal axis in FIG. 3a represents the pulse sample number n in X(n). The horizontal axis in FIG. 3b represents the n value determined in the short term variance block 202 in response to the pulse samples in FIG. 3a, while the horizontal axis in FIG. 3c represents the $n^{th}$ value determined in the long term variance block 204 in response to the pulse samples in FIG. 3a. The horizontal axis in FIG. 3d represents the sample number n in the detector samples Y(n) as they are produced by the divider 266.

FIG. 3a illustrates the pulse sample values returned to the target detector 102 by the receiver 110. These values appear on the pulse sample input line 200. Note that in this example, the average value of the pulse samples is approximately 30, but that there is some variance, even in the fixed scene, about the value 30. This variance may be caused by, for example, scintillation effects. Such effects cause the reflected energy to take semi-random paths back to the receiver antenna 126 due to turbulence in the air or multipath reflections.

Figure 3:
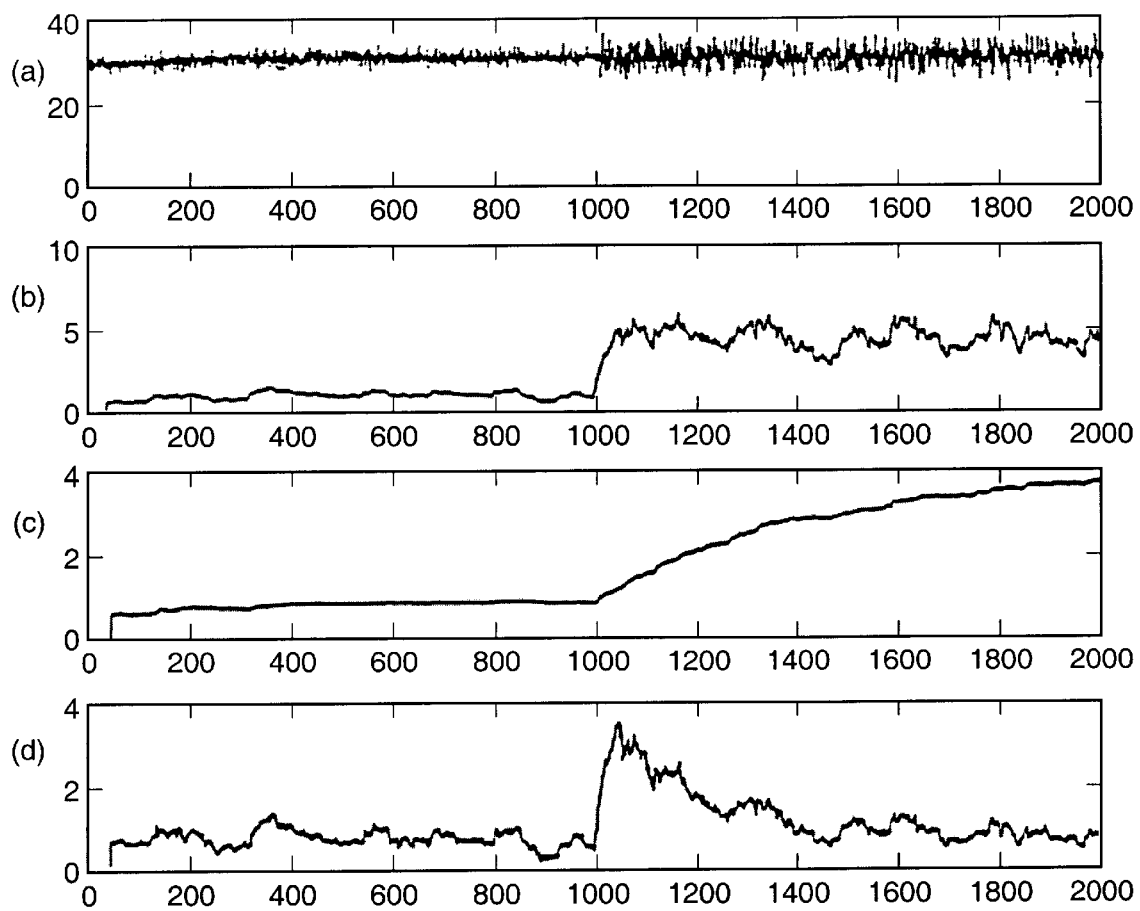

At pulse sample 1000, a target enters the fixed scene 120. The target does not add significantly to the average value of the pulse samples because the target is small, or because it does not reflect much energy. Such a target may be, for example, a person walking through the fixed scene 120. The target, however, does increase the variance in the average as is shown in FIG. 3a by the increase in maximum and minimum values of the pulse samples from sample 1000 onward. The additional variance may be caused by a number of phenomenon including the new target moving relative to the wavelength of the radiated pulses emitted by ranging device 100 or by the additional scatter points that the target adds to the scene. Scatter points are points on the target that reflect energy incident upon them. Even on a small target, there may be enough scatter points to raise the variance in received energy at the receiver antenna 126. A typical radar, using the mean of the pulse samples to detect targets, usually will not detect the target causing the behavior shown in FIG. 3 because the mean of the pulse samples is still approximately 30.

The target detector 102, however, may detect such targets. The target detector determines the short term variance of the pulse samples, shown in FIG. 3b, and the long term variance of the pulse samples, shown in FIG. 3c. During the first 1000 pulse samples, the short term variance and the long term variance show no significant disturbances. When the target enters the scene however, the short term variance shown in FIG. 3b quickly adjusts according to the additional variance caused by the target. This is shown in FIG. 3b as the increase in the short term variance shown in FIG. 3b around sample 1000. Note that the long term variance shown in FIG. 3c begins to increase as well, but responds more slowly. The detector samples, shown in FIG. 3d, represent the ratio of the short term variance in FIG. 3b to the long term variance in FIG. 3c. A noticeable peak occurs in this ratio in FIG. 3d when the target enters the scene at sample 1000. Thus, the detector samples are highly indicative of a target detection. The detector samples may be used by the post processor 112 to update the display 114 according to whether the detector samples indicate a detection or a non-detection. The post processor may be configured to recognize a peak in the detector samples, such as the one shown in FIG. 3d, as a detection, for example. The post processor 112 may also provide additional detection discrimination functions, such as requiring that, for example, two of the last three sweeps and resulting detector samples indicate a detection before the detection is indicated on the display 114.

Figure 4:
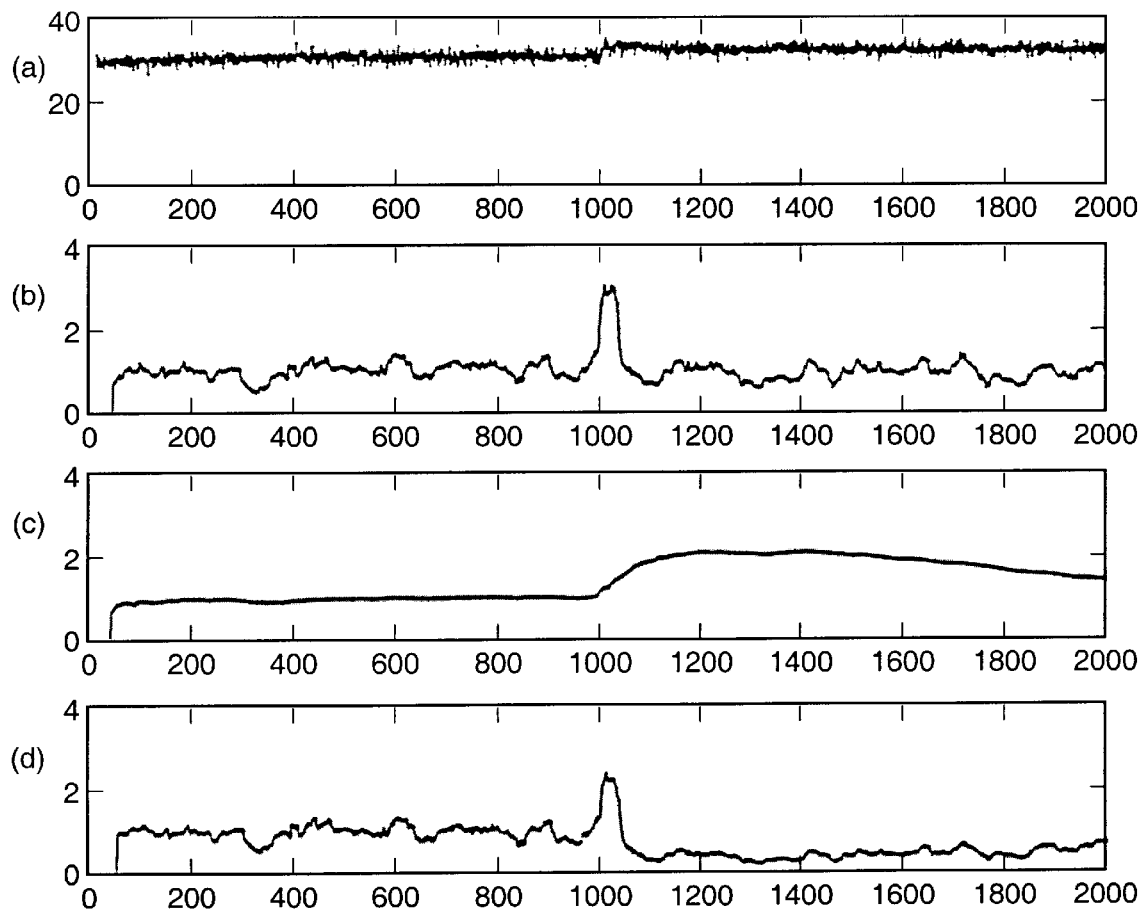

Turning now to FIGS. 4a—4d, they also show an example of the operation of the ranging device 100 staring at a fixed scene 120 and incorporating the target detector 102. Again, the horizontal axis in FIG. 4a represents the pulse sample number n in X(n). The horizontal axis in FIG. 4b represents the $n^{th}$ value determined in the short term variance block 202 in response to the pulse samples in FIG. 4a, while the horizontal axis in FIG. 4c represents the $n^{th}$ value determined in the long term variance block 204 in response to the pulse samples in FIG. 4a. The horizontal axis in FIG. 4d represents the sample number n in the detector samples Y(n) as they are produced by the divider 266.

FIG. 4a illustrates pulse sample values returned to the target detector 102 by the receiver 110. Note that again in this example, the average value of the pulse samples is approximately 30, but that there is some variance, even in the fixed scene, about the value 30. At pulse sample 1000, a target enters the fixed scene 120. This time, however, the target does add to the average value of X(n), but does not contribute significantly to the variance in X(n).

The target detector 102 may detect such targets as well. The target detector determines the short term variance of the pulse samples, shown in FIG. 4b, and the long term variance of the pulse samples, shown in FIG. 4c. During the first 1000 pulse samples, the short term variance and the long term variance show no significant disturbances. When the target enters the scene however, the short term variance shown in FIG. 4b quickly peaks because the increase in the average of the pulse samples at sample 1000 necessarily causes a jump in the variance of the pulse samples in the immediate area of the increase in the average of pulse samples. This is shown in FIG. 4b as a short spike in the short term variance. Note that the long term variance shown in FIG. 4c begins to increase as well, but responds more slowly. The detector samples, shown in FIG. 4d, represent the ratio of the short term variance in FIG. 4b to the long term variance in FIG. 4c. A noticeable peak occurs in this ratio when the target enters the scene. Thus, the detector samples are also highly indicative of a target detection in the case where the average value of the pulse samples increases. Again, the detector samples may be used by the post processor 112 to update the display 114 according to whether the detector samples show a large enough peak to indicate a detection.

In addition to any other discrimination functions, the post processor 112 may also incorporate a threshold limit that ignores detector samples that are not great enough to indicate a detection with substantial certainty. Thus, in FIG. 4d, a threshold limit set at approximately 4 would cause the post processor 112 to ignore the short spike. On the other hand, a threshold limit set at approximately 2 would cause the post processor 112 to recognize the short spike as a possible target detection. The threshold limit may be set by allowing the ranging detector 100 to stare at a fixed scene 120 with and without targets and gathering statistics on the received pulses. Once the statistics have been gathered, they may be used to select a threshold limit that results in a predetermined probability that the variance in a received pulse returned from a scene without a target is large enough to cause a detection. Thus, the post processor 112 may perform a CFAR type of discrimination function, but performed on higher order statistics of the pulse samples. In such a case, the ranging device 100 will continue to detect a wider range of targets than CFAR type ranging devices and also perform filtering of spurious sample pulse variances.

Figure 5:
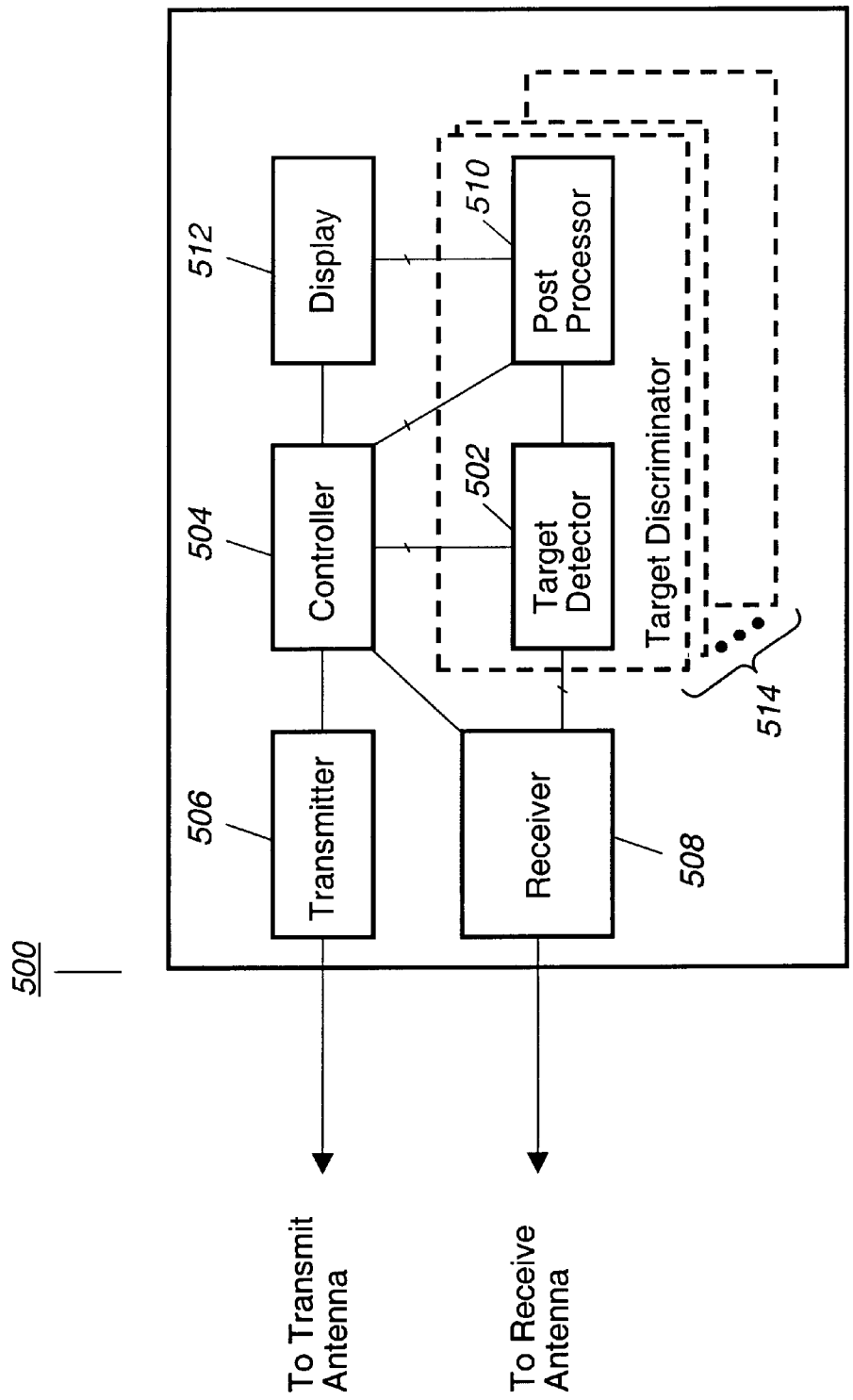
FIG. 5 illustrates a high level block diagram of a ranging device configured to operate over multiple range bins.

As mentioned above, the ranging device 100 may separate the scene into a discrete number of range bins, each representing a predetermined distance range into the scene. FIG. 5 illustrates a ranging device 500 configured to operate with multiple range bins. The ranging device 500 includes target detectors 502, a controller 504, a transmitter 506, a receiver 508, post processors 510, a display 512, and target discriminators 514 (which include the target detectors 502 and the post processors 510). The hash marks on the lines connecting the controller 504, the target detector 502, the post processors 510, and the display 512 indicate that multiple signal lines may be used to control the individual target discriminators 514.

The ranging device 500 may use multiple target discriminators 514, each associated with a range bin, as shown in FIG. 5. Each target discriminator 514 may include a target detector 502 and a post processor 510 associated with a range bin. Alternatively, a smaller number of post processors 510 may be used to analyze the detector samples produced by the target detectors 502. For example, a single DSP may be used to analyze the detector samples produced by all of the target detectors 502 and to update that display 512. Furthermore, more than one type of target detector 502 may be configured to analyze a particular range bin, thus providing, for example, fault tolerance or detections of targets having different characteristics. The ranging device 500 may use a single DSP to provide the functionality of both the target detector 502 and the post processor 510.

In operation, the receiver 508 produces separate sample pulses corresponding to each range bin from the received pulses. The receiver 508 distributes the pulse samples to the particular target detector 502 in the target discriminator 514 assigned to the associated range bin. The target detector 502 then operates as described above to produce detector samples that will be further analyzed by the post processor 510, also as described above.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

We claim:

1. A ranging device for monitoring a scene of interest, the ranging device comprising:
   a transmitter for transmitting pulses toward a scene of interest;
   a receiver generating pulse samples indicative of a content of the scene of interest based on returned pulses; and
   a target discriminator including a detector sample output for identifying changes in a scene of interest arising from at least one of a target entering said scene of interest, a target leaving said scene of interest, and a target moving in said scene of interest, based on short term high order statistical samples derived from said pulse samples in comparison with long term high order statistical samples derived from said pulse samples.

2. The ranging device of claim 1, wherein said target discriminator outputs on said detector sample output a ratio of said short term high order statistical samples to said long term high order statistical samples for identifying chances in a scene of interest.

3. The ranging device of claim 1, wherein said target discriminator further comprises a post processor for identifying said changes in said scene of interest.

4. The ranging device of claim 1, further comprising a receiving antenna connected to said receiver for detecting returned pulses and providing them to said receiver.

5. The ranging device of claim 1, further comprising a transmit antenna connected to said transmitter for emitting said pulses.

6. The ranging device of claim 1, further comprising a display connected to said target discriminator.

7. The ranging device of claim 1, wherein said short term high order statistical samples constitute a short term variance of a predetermined number of said pulse samples.

8. The ranging device of claim 1, wherein said long term high order statistic samples constitute a long term variance of said pulse samples.

9. The ranging device of claim 1, wherein said target discriminator further comprises a delay line.

10. The ranging device of claim 9 wherein said delay line comprises a predetermined number of memory elements.

11. The ranging device of claim 10 wherein said plurality of memory elements numbers at least 16.

12. The ranging device of claim 1, wherein said target discriminator further comprises:
    a storage element for storing a previous long term high order statistical sample;
    a startup function for scaling a current pulse sample to produce a scaled current pulse sample and for scaling a previous long term high order statistical sample to produce a scaled long term high order statistical sample; and
    an adder for adding said scaled current pulse sample to said scaled previous long term high order statistical sample.

13. The ranging device of claim 12, wherein the startup function comprises values that allow said adder to establish an estimate of said long term high order statistical samples.

14. The ranging device of claim 13, wherein the start up function further comprises values that allow said adder to gradually give more weight to said previous long term high order statistic sample.

15. The ranging device of claim 12, wherein the startup function comprises a leaky accumulator function.

16. The ranging device of claim 2, wherein said target detector further comprises:
    first circuitry for generating sum-of-squares signal samples from said pulse samples;
    second circuitry for generating square-of-sums signal samples from said pulse samples;
    a multiplier for proportioning the sum-of-squares signal samples according to a predetermined number of delay elements; and
    an adder for adding said sum-of-squares signal samples to said square-of-sums signal samples.

17. The ranging device of claim 12, wherein said startup function comprises a weighting function $M(n)=\{1, 2, 3, \ldots, M_{max}, M_{max}, \ldots\}$.

18. A ranging device for monitoring a scene of interest divided into a predetermined number of range bins located at differing distances from the ranging device, each range bin corresponding to a subscene, the ranging device comprising:
    a transmitter for transmitting pulses toward a scene of interest;
    a receiver generating sets of separate pulse samples associated with each range bin corresponding to a subscene in response to received pulses;
    a plurality of target discriminators, each target discriminator associated with at least one of said range bins, each target discriminator receiving at least one of said sets of separate pulse samples corresponding to an associated range bin, each target discriminator identifying changes in a corresponding subscene from at least one of a target entering said scene of interest, a target leaving said scene of interest, and a target moving in said scene of interest, in response to at least one non-averaging statistical characteristic of said sets of separate pulse samples associated with said corresponding subscene; and wherein each target discriminator further comprises a target detector generating long term high order statistical samples constituting the non-averaging statistical characteristic; and wherein said target detector further comprises:

a storage element for storing a previous long term high order statistical sample;

a startup function for scaling a current pulse sample to produce a scaled current pulse sample and for scaling a Previous long term high order statistical sample to produce a scaled long term high order statistical sample; and an adder for adding said scaled current pulse sample to said scaled previous long term high order statistical sample.

19. The ranging device of claim 18, wherein said plurality of target discriminators each further comprises a target detector generating short term high order statistical samples in response to the pulse samples, said short term high order statistical samples constituting a non-averaging statistical characteristic of said pulse samples.

20. The ranging device of claim 18, wherein said plurality of target discriminators each calculates a ratio of at least two non-averaged statistical characteristics of said pulse samples, said target discriminator identifying said changes in said scene of interest.

21. The ranging device of claim 18, wherein said plurality of target discriminators further comprises at least one post processor for identifying said changes in said scene of interest.

22. The ranging device of claim 18, further comprising a receiving antenna connected to said receiver for detecting returned pulses and providing them to said receiver.

23. The ranging device of claim 18, further comprising a transmit antenna connected to said transmitter for emitting said pulses.

24. The ranging device of claim 18, further comprising a display connected to at least one of said plurality of target discriminators.

25. The ranging device of claim 19, wherein said short term high order statistic samples constitute a short term variance of a predetermined number of said pulse samples.

26. The ranging device of claim 20, wherein said long term high order statistic samples approximate a long term variance of said pulse samples.

27. The ranging device of claim 19 wherein said target detector further comprises a delay line.

28. The ranging device of claim 27 wherein said delay line comprises a predetermined number of memory elements.

29. The ranging device of claim 28 wherein said plurality of memory elements numbers at least 16.

30. The ranging device of claim 19, wherein said startup function comprises values that allow said adder to establish an estimate of said long term high order statistical samples.

31. The ranging device of claim 30, wherein the start up function further comprises values that allow said adder to gradually give more weight to said previous long term high order statistic sample.

32. The ranging device of claim 19, wherein the startup function comprises a leaky accumulator function.

33. The ranging device of claim 19, wherein said target detector further comprises:

first circuitry for generating sum-of-squares signal samples from said pulse samples;

second circuitry for generating square-of-sums signal samples from said pulse samples;

a multiplier for proportioning the sum-of-squares signal samples according to a predetermined number of delay elements; and an adder for adding said sum-of-squares signal samples to said square-of-sums signal samples.

34. The ranging device of claim 30, wherein said startup function comprises a weighting function $M(n)=\{1, 2, 3, \ldots, M_{max}, M_{max}, \ldots\}$.

35. A method for monitoring a scene of interest, comprising the steps of:

transmitting pulses into a scene of interest;

receiving returned pulses;

generating pulse samples from said returned pulses;

generating short term high order statistical sampled derived from said pulse samples;

generating long term high order statistical sampled derived from said pulse samples; and identifying changes in said scene of interest arising from at least one of a target entering said scene of interest, a target leaving said scene of interest, and a target moving in said scene of interest based on said short term high order statistical samples in comparison with said long term high order statistical samples.

36. The method of claim 35, wherein identifying changes further comprises calculating a ratio of said short term high order statistical samples to said long term high order statistical samples.

37. The method of claim 35, wherein generating short term high order statistical samples further comprises generating a short term variance of a predetermined number of said pulse samples.

38. The method of claim 35, wherein generating long term high order statistical samples further comprises generating a long term variance of said pulse samples.

39. The method of claim 38, wherein said step of generating long term high order statistic samples further comprises the steps of:

storing a previous long term high order statistical sample;

applying a startup function for scaling a current pulse sample to produce a scaled current pulse sample and for scaling a previous long term high order statistical sample to produce a scaled long term high order statistical sample;

adding said scaled current pulse sample to said scaled previous long term high order statistical sample.

40. The method of claim 37, wherein said step of generating short term statistical samples further comprises the steps of:

generating sum-of-squares signal samples from said pulse samples;

generating square-of-sums signal samples from said pulse samples;

proportioning the sum-of-squares signal samples according to a predetermined number of delay elements; and adding said sum-of-squares signal samples to said square-of-sums signal samples.

41. The method of claim 35, further comprising the steps of:

observing said scene of interest in the absence of said target; and observing said scene of interest in the presence of said target;

setting a threshold level for screening out fluctuations in the absence of said target in said non-averaging statistical characteristic that lie below said threshold level.

42. The method of claim 41, wherein said step of identifying changes further comprises the step of:

detecting when n of m of said non-averaging statistical characteristics lie above said threshold level, where n and m are integers.

43. The method of claim 41, wherein said step of identifying changes further comprises the step of:

detecting when n consecutive non-averaging statistical characteristics lie above said threshold level, where n is an integer.

44. The method of claim 39, wherein applying a startup function further comprises applying a weighting function $M(n)=\{1, 2, 3, \ldots, M_{max}, M_{max}, \ldots\}$.

45. A target discriminator for identifying changes in a scene of interest, the target discriminator comprising:
  a target detector for generating non-averaging long term high order statistical samples in response to pulse samples generated from returned pulses from a scene of interest;
  a post processor for detecting changes in said scene of interest arising from at least one of a target entering said scene of interest, a target leaving said scene of interest, and a target moving in said scene of interest in response to said non-averaging statistical samples; and wherein said target detector comprises:
    a storage element for storing a previous long term high order statistical sample;
    a startup function for scaling a current pulse sample to produce a scaled current pulse sample and for scaling a previous long term high order statistical sample to produce a scaled long term high order statistical sample;
    an adder for adding said scaled current pulse simple to said scaled previous long term high order statistical sample.

46. The target discriminator of claim 45, wherein said non-averaging statistical samples are short term high order statistical samples.

47. The target discriminator of claim 45, wherein said target detector calculates a ratio of at least two non-averaged statistical characteristics of said pulse samples.

48. The target discriminator of claim 45, further comprising a display connected to said post processor.

49. The target discriminator of claim 46, wherein said short term high order statistic samples constitute a short term variance of a predetermined number of said pulse samples.

50. The target discriminator of claim 47, wherein said long term high order statistic samples constitute a long term variance of said pulse samples.

51. The target discriminator of claim 46 wherein said target detector further comprises a delay line.

52. The target discriminator of claim 51 wherein said delay line comprises a predetermined number of memory elements.

53. The target discriminator of claim 52 wherein said plurality of memory elements numbers at least 16.

54. The target discriminator of claim 45, wherein said startup function comprises values that allow said adder to establish an estimate of said long term high order statistical samples.

55. The target discriminator of claim 54, wherein the start up function further comprises values that allow said adder to gradually give more weight to said previous long term high order statistic sample.

56. The target discriminator of claim 45, wherein the startup function comprises a leaky accumulator function.

57. The target discriminator of claim 46, wherein said target detector further comprises:
  first circuitry for generating sum-of-squares signal samples from said pulse samples;
  second circuitry for generating square-of-sums signal samples from said pulse samples;
  a multiplier for proportioning the sum-of-squares signal samples according to a predetermined number of delay elements; and
  an adder for adding said sum-of-squares signal samples to said square-of-sums signal samples.

58. The target discriminator of claim 56, wherein said startup function comprises a weighting function $M(n)=\{1, 2, 3, \ldots, M_{max}, M_{max}, \ldots\}$.

* * * * *